United States Patent
Kröger et al.

(10) Patent No.: US 7,513,137 B2
(45) Date of Patent: Apr. 7, 2009

(54) METHOD OF MAKING A SHAPED SHEET-METAL PART

(75) Inventors: Dirk Kröger, Lichtenau (DE); Hans-Jürgen Knaup, Bad Lippspringe (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 2 days.

(21) Appl. No.: 11/586,253

(22) Filed: Oct. 25, 2006

(65) Prior Publication Data

US 2007/0107203 A1    May 17, 2007

(30) Foreign Application Priority Data

Oct. 25, 2005    (DE) .................... 10 2005 051 403

(51) Int. Cl.
*B21D 37/16* (2006.01)
*B21D 28/00* (2006.01)

(52) U.S. Cl. ..................... 72/342.5; 72/340

(58) Field of Classification Search .......... 72/324, 72/331, 335, 338, 339, 342.2, 342.5, 379.2, 72/342.6, 340; 83/862–865
See application file for complete search history.

(56) References Cited

U.S. PATENT DOCUMENTS

| 3,703,093 | A | * | 11/1972 | Komatsu et al. | ........... 72/342.4 |
| 4,215,194 | A | * | 7/1980 | Shepherd | ................. 430/323 |
| 4,502,309 | A | * | 3/1985 | Hamilton et al. | ............... 72/60 |
| 5,445,001 | A | * | 8/1995 | Snavely | ......................... 72/55 |
| 6,481,259 | B1 | * | 11/2002 | Durney | ....................... 72/324 |
| 6,613,164 | B2 | * | 9/2003 | Dykstra et al. | ............. 148/520 |
| 6,868,708 | B2 | * | 3/2005 | Carlsson et al. | ........... 72/342.6 |
| 2006/0137779 | A1 | | 6/2006 | Brodt | |

FOREIGN PATENT DOCUMENTS

GB    1 490 535    11/1977
WO    075 279    8/2005

* cited by examiner

*Primary Examiner*—Dana Ross
*Assistant Examiner*—Teresa Bonk
(74) *Attorney, Agent, or Firm*—Andrew Wilford

(57) ABSTRACT

A shaped part is made by forming in a flat steel plate a thickness-reducing groove and hot-shaping and hardening the flat steel plate into a three-dimensional shape. Then the plate formed with the groove is cooled, and a piece is sheared off the cooled plate along a cut line in the groove.

9 Claims, 4 Drawing Sheets

METHOD OF MAKING A SHAPED SHEET-METAL PART

FIELD OF THE INVENTION

The present invention relates to a sheet-metal part. More particularly this invention concerns a method of making such a part by hot shaping and trimming.

BACKGROUND OF THE INVENTION

A method for press shaping and hardening a sheet-steel workpiece having a small material thickness and good dimensional accuracy is known from GB 1,490,535. Here the steel blank is heated to a temperature above $AC_3$, then pressed in less than 5 sec into the final shape between two indirectly cooled shaping tools while being deformed, and then rapidly cooled, while remaining in the press, to obtain a martensitic and/or bainitic fine-grained structure. A hot-formed part produced this way is used in vehicle construction, for example, for structural and safety parts such as bumpers and B-columns. Hereinafter, the above-described shaping and hardening of a workpiece that has been heated to over $AC_3$ while remaining in a press is defined as hot shaping. Hot shaping can be carried out both with a flat sheet and a previously cold-formed blank.

So as to cut a part produced this way with good dimensional accuracy, however, there are considerable problems. In particular, cold-cutting hardened materials (hard cutting) requires very high cutting forces, resulting in rapid tool wear and high maintenance costs. Furthermore, the cold cutting of high-strength parts is problematic since the cut edges have some burrs, which may quickly cause cracking in the part due to the high notch sensitivity of the high-strength materials. A high-strength part can be cut only to a limited extent, or not at all, depending on material thickness.

So as to avoid the difficulties occurring during the mechanical cutting of hardened parts, frequently alternative cutting methods are used, such as laser cutting or water jet cutting. While these methods allow high quality trimming of the part edge, these cutting methods operate relatively slowly since the cycle times depend directly on the length of the cutting edge as well as the required tolerances. Hence US 2006/137779 of Brodt therefore proposes trimming the edges of a blank that largely corresponds to the contour already in the unhardened state of the part. This is intended to avoid trimming of the part after hardening by the hot-shaping process. However, this is only possible if the tolerances of the part permit such a method.

Furthermore, WO 2005/075279 of Dreher proposes to locally reduce the material thickness in certain areas of a structural part made of sheet metal in that the part is provided with a locally defined stamping during hot shaping. However, this method only serves to adapt two or more parts in terms of material thickness such that the parts can be joined in a controlled manner. This method therefore does not take the above-described trimming problem of high-strength parts into consideration.

OBJECTS OF THE INVENTION

It is therefore an object of the present invention to provide an improved method of making an accurately dimensioned hot-shaped part.

Another object is the provision of such an improved method of making an accurately dimensioned hot-shaped part that overcomes the above-given disadvantages, in particular that allows the part to be trimmed even when relatively thick and made of very hard material.

SUMMARY OF THE INVENTION

A shaped part is made according to the invention by forming in a flat steel plate adjacent an edge thereof a thickness-reducing groove and hot-shaping and hardening the flat steel plate into a three-dimensional shape. Then the plate formed with the groove is cooled, and a piece is sheared off the cooled plate along a cut line in the groove.

Thus according to the invention at least one groove is formed in a cutting zone of the sheet and/or of the workpiece prior to or during the hot-shaping operation. This groove consequently reduces the wall thickness of the part in the cutting area. Following hot shaping, the hardened workpiece is trimmed in the groove. This is intended to facilitate, or simply enable, particularly the hard cutting in the cutting region. The thinner the material thickness in the cutting region, the lower the forces required during hard cutting. The cutting forces required in the cutting region with the groove are significantly lower than the cutting forces required for the sheet metal thickness outside the groove. The lower cutting force also reduces tooling wear. Overall, this results in a cost-efficient design of the cutting tool and lower maintenance costs. If the thickness at the groove remains below the critical sheet metal thickness for hard cutting, optionally more expensive cutting methods, such as the afore-mentioned laser or water jet cutting methods, can be avoided. However, even if the sheet metal thickness is not reduced to below the critical thickness level as a result of the groove for manufacturing reasons or reasons associated with the product, the cutting thickness is reduced at the groove also for the more expensive jet methods, thus allowing an increased cutting speed and improved cost efficiency.

Moreover, the invention is advantageous when instead of a sheet with an even wall thickness a sheet with varying sheet thickness levels within the sheet is used and only some regions of the sheet exceed the critical wall thickness for hard cutting. In this case it suffices to provide only the areas that are critical for hard cutting with a groove so as to be able to hard-cut the entire part after hot shaping. Otherwise, the entire part would need to be machined with an alternative, more expensive cutting method, such as laser cutting, because for process economy reasons it is even less economical to use two different cutting methods, namely hard cutting in the non-critical areas and laser cutting in the critical areas, successively on the high-strength part.

In one embodiment of the invention, the groove can be formed in the cold starting workpiece by a standard cold-shaping operation. The advantage here is that during stamping of the cold plate no contact is established with the plate that is otherwise heated to over $AC_3$ or is carried out, if needed, on a cold preformed workpiece, which may result in quicker cooling of the edge regions of the workpiece in relation to the remaining workpiece areas, which have to be hot formed. In the cold state, the groove can be provided in the subsequently trimmed edge regions of the plate or the workpiece in the cold state easily and in a controlled fashion, however only if the part geometry allows the economical decrease in plate thickness without complex tooling steps. This depends on the complexity of the shaping operation for the part.

In another embodiment according to the invention, the groove can be formed during hot shaping. This can be achieved by stamped surfaces or a groove ring in the die of the hot-shaping tool. The groove extends either along the entire cutting edge, or it extends only across cutting edge regions that exceed a defined sheet metal thickness. However, problems associated with providing the groove during the hot-shaping operation are that during hardening of the workpiece in the tool during hot shaping the required cooling speed depends above all on the contact of the cooled tool surface with the material. Particularly in the edge region of the plate or of the preformed workpiece, due to the unavoidable contact of the plate or the workpiece with a plate retainer and other tooling elements the material cools so drastically during the closing movement of the tool that relatively high forces are required for the grooving operation in the edge region. These forces must be maintained during the entire during which the workpiece remains in the tool. Furthermore, during hot shaping the gap in the groove area has to be smaller by the desired reduction in plate thickness, which makes the tooling contact more difficult in the remaining areas. However, these difficulties can be eliminated with fine adjustments of the processes in terms of the shaping temperature and shaping speed.

In a third embodiment of the method according to the invention, the groove is provided after heating the plate or the preformed workpiece to a temperature above $AC_3$ by means of a rapid press prior to the actual hot-shaping operation. The rapid press produces the groove in the plate or the workpiece like a forging hammer so that the press contact times are minimized and the plate or the preformed workpiece remains above the critical temperature level for the directly following hot-shaping process. This way, the pressing forces required in the area of the groove during hot shaping for calibration and the dwell time can be reduced, while at the same time ensuring that sufficient residual heat is available in the part to perform the hot-shaping operation.

Since in most parts, the flanges provided in the edge regions, and in this case particularly the regions of the cutting edges, are among the regions subject to the highest loads, where frequently cracking resulting in part failure originates, a wall thickness reduction may increase cracking in the sensitive edge region due to the groove of this invention. Thus according to the invention any projection of the groove into the cutting area is minimized along the cut workpiece edge. This avoids any additional weakening of the part at the flange and particularly along the cutting edge.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
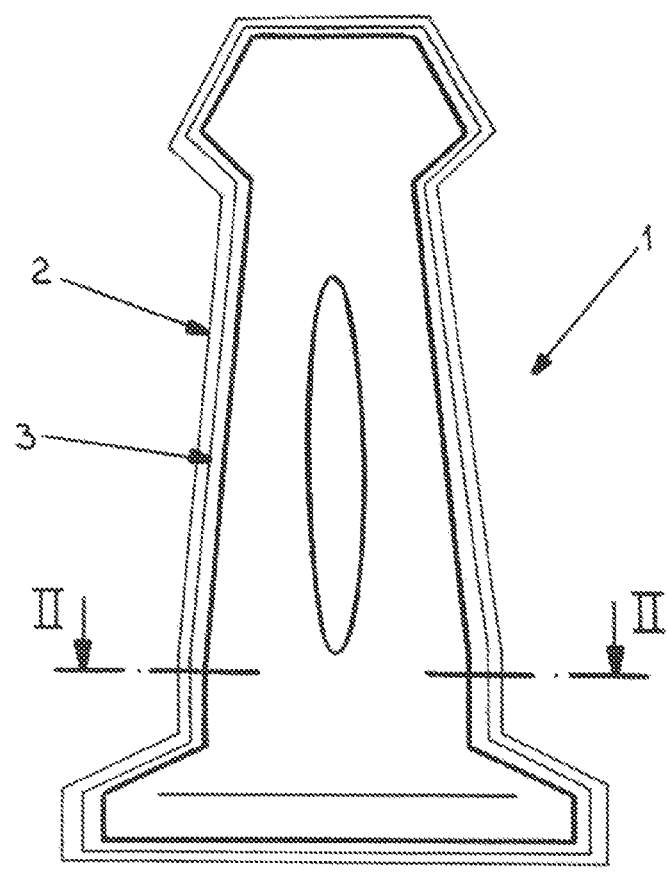
FIG. 1 shows a B-column with constant sheet metal thickness.

As seen in FIG. 1 illustrates a B-column 1 that has been produced with the method according to the invention, for installation in a motor vehicle. The B-column 1 is a relatively complex deep-drawn part that due to its function as a structural and safety part is exposed to high stress in the event of an accident and must not fail. Therefore, the B-column 1 is hot-shaped from a relatively thin, hardenable steel sheet or plate, particularly when produced in a lightweight construction. The B-column 1 has a constant sheet thickness t of 1.8 mm and hardness of about 1400 N/mm2. The same values also apply to a flange 2 of the B-column 1. A peripheral groove 3 has been provided in the peripheral flange 2 prior to or during the hot-shaping operation.

Figure 2:
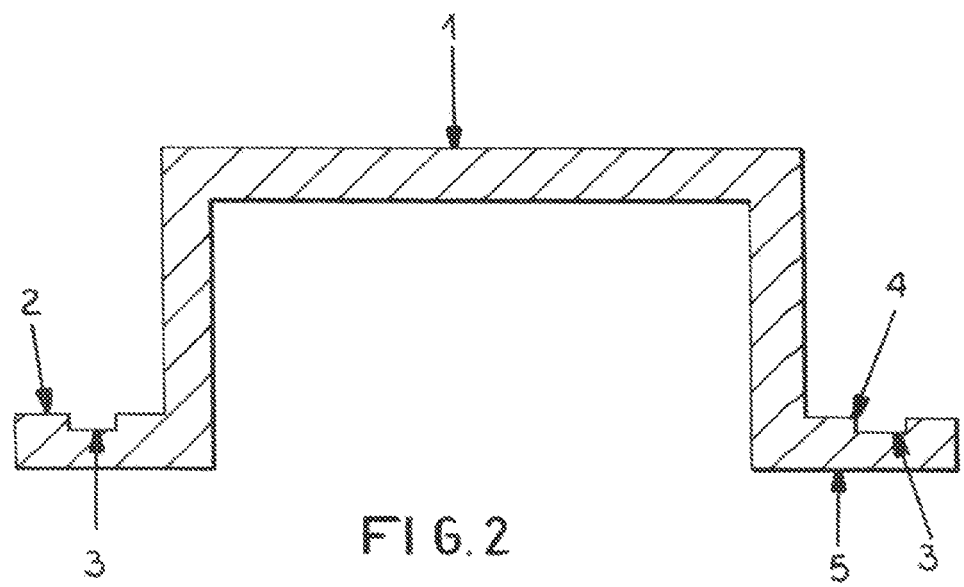
FIG. 2 is a section taken along line II-II of FIG. 1.

FIG. 2 shows how the groove 3 forms a region of a thinner wall thickness than the flange 2. In the groove 3, the hardened B-column 1 is cut as described below to the tolerance settings. The cut is guided as closely along the flank 4 as possible in order to prevent cracking. The groove 3 in this example is of rectangular shape and has a width of 10 mm. The crucial aspect for the width is that the groove 3 during subsequent trimming can be reliably identified and the part can be sheared in the groove 3 in a controlled manner. During formation of the groove 3 particular attention should be paid that a face 5 of the part 1 opposite the groove 3 is not subjected to any deformation, that is substantially flat and preferably planar, since this face 5 opposite the groove 3 in most cases forms a contact surface to subsequently attached parts and therefore has to be of superior quality.

Figure 3:
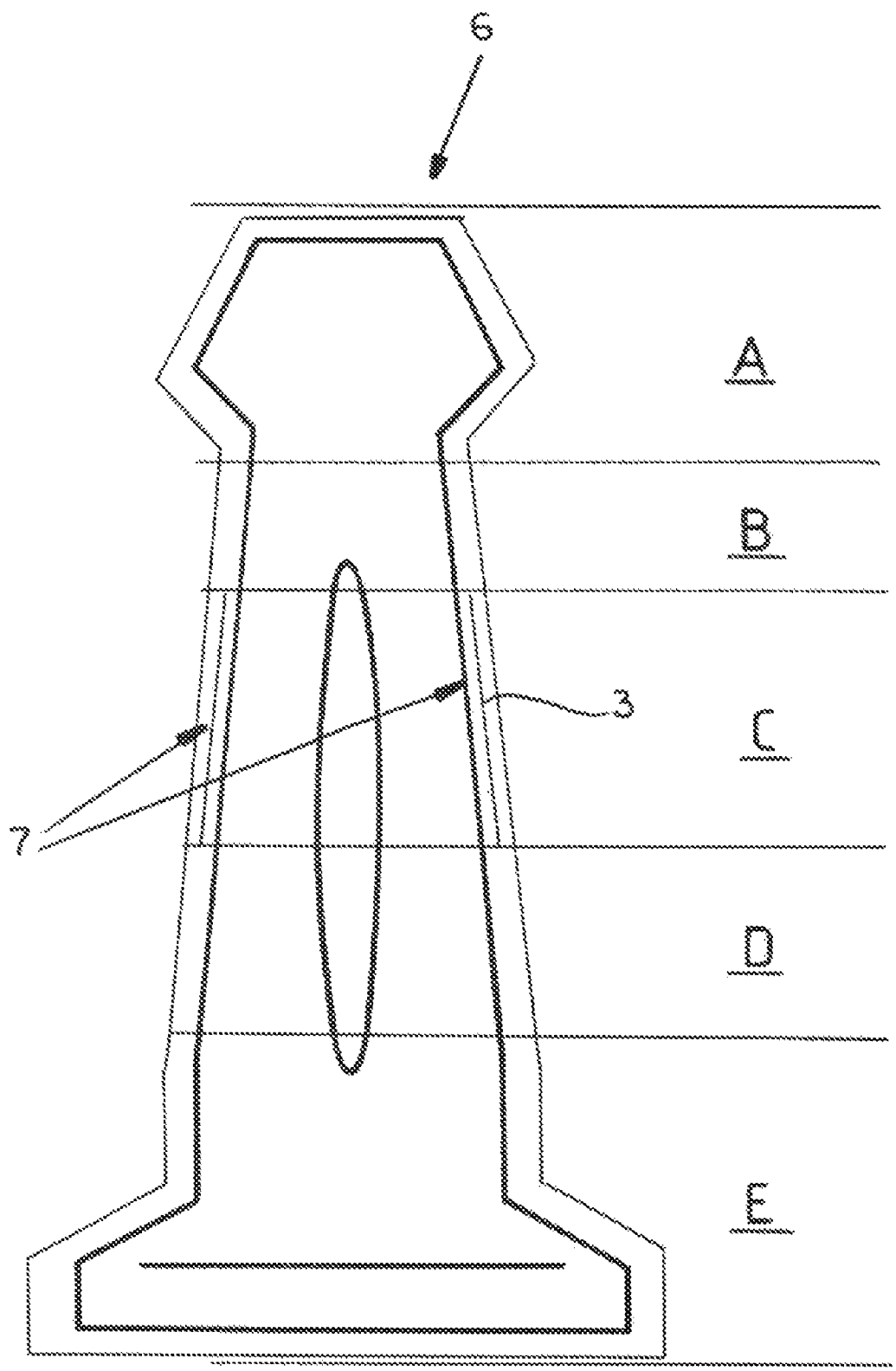
FIG. 3 is a view like FIG. 1 of another B-column according to the invention.

FIG. 3 shows a B-column 6 that has been hot-formed from a varied-thickness rolled blank, for example. Such a rolled blank is typically a sheet pulled off a coil and has varying sheet thicknesses in defined regions produced by a rolling process. Accordingly, the B-column 6 comprises several sections A to E with varying sheet thicknesses. The sheet thickness t in section A, for example, is 1.4 mm, in section B t=1.75 mm, in section C t=2.4 mm, in section D t=1.9 mm and at the base of the B-column 1 t is again 1.4 mm. The B-column 6 is provided with a peripheral flange 7. In this example, the section C exceeds the critical value for hard cutting. A groove 3 that reduces sheet thickness is therefore only provided in the flange 7 in section C.

Figure 4:
FIGS. 4-7 are vertical section schematically illustrating the method of this invention.

FIG. 4 shows how, initially, the part according to the invention is formed from a substantially flat workpiece W1 here shown to be of uniform thickness. This workpiece W1 may also be formed with a groove 3'.

Figure 5:
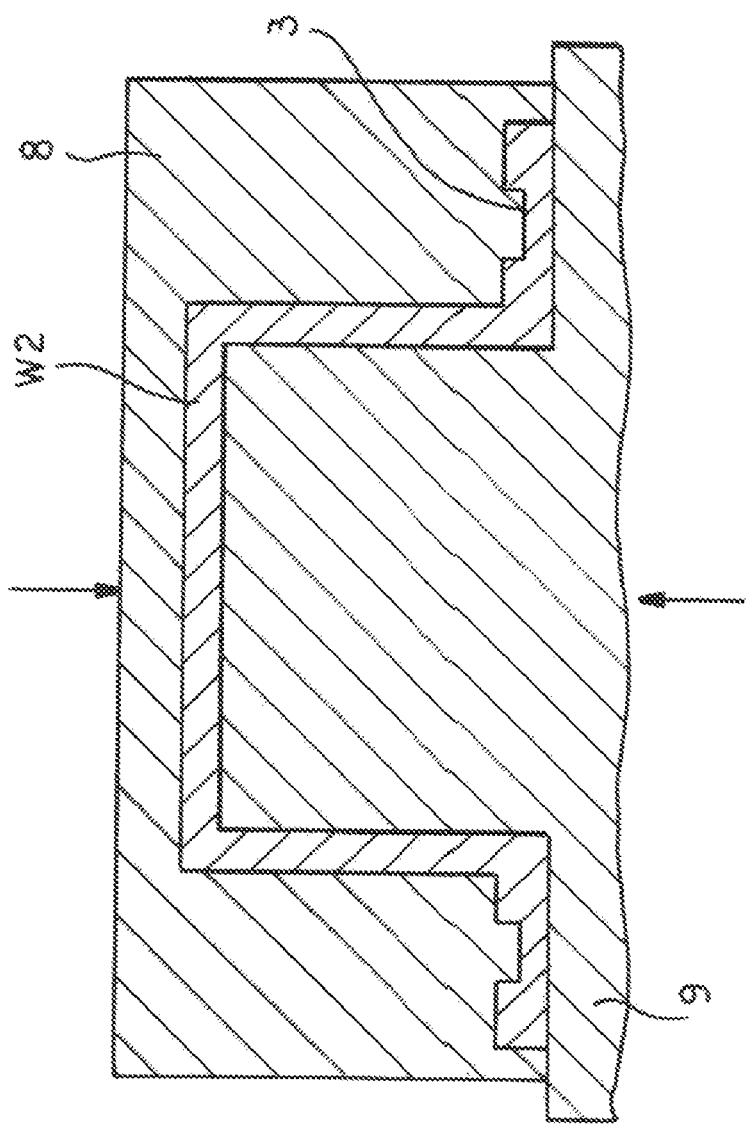

FIG. 5 shows the use of heated tools or dies 8 and 9 that deform the workpiece W1 into a shaped workpiece W2. If there is no preformed groove 3', the groove 3 is formed at this stage, either all around the workpiece W2 or only in regions of extra thickness.

Figure 6:
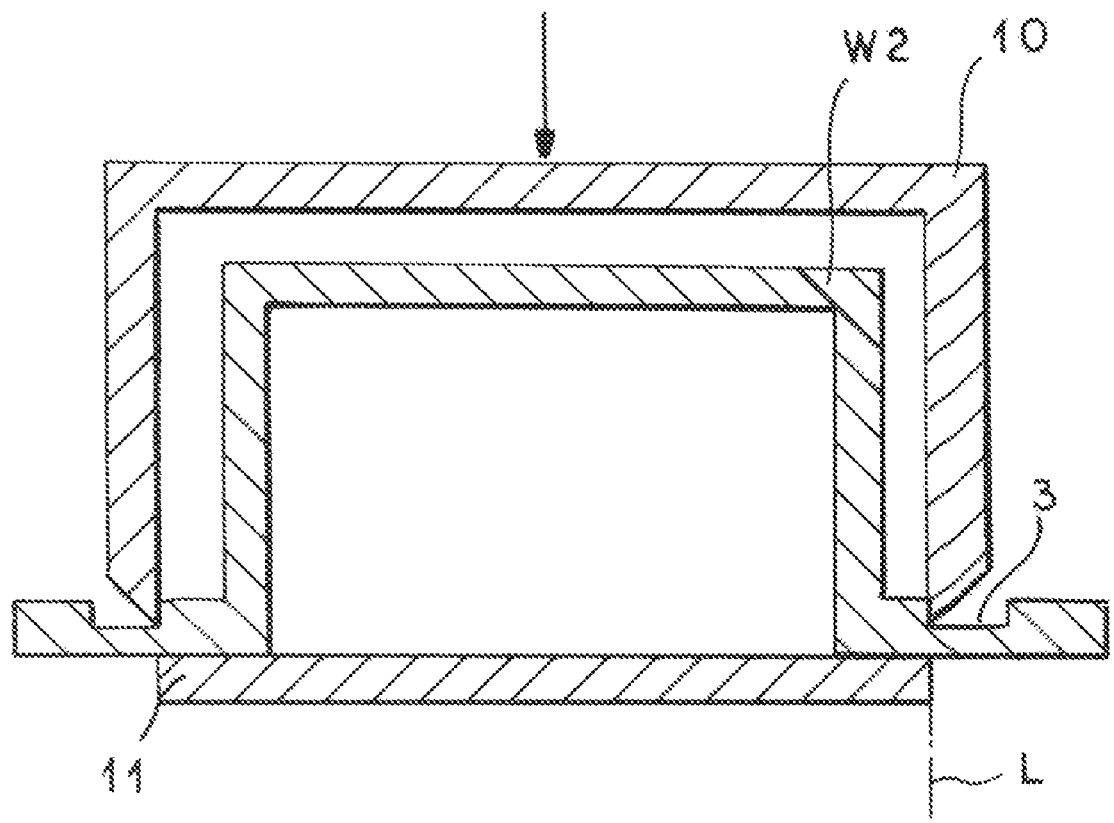

FIG. 6 shows how a cutting tool 10 is pressed down against the workpiece W2 supported on another tool 11 to shear off the outer part of the flange along a cut line L defined by the inner edge of the tool 10 and the outer edge of the tool 11 and lying at the inner flank of the groove 3.

Figure 7:
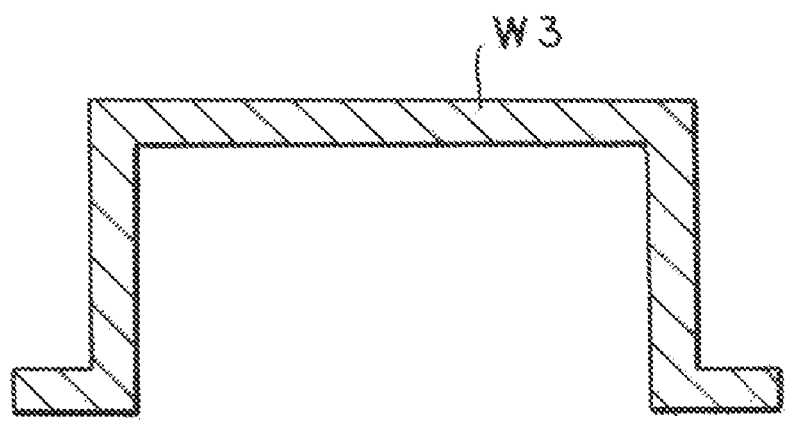

FIG. 7 shows the resultant finished workpiece W3 which has a smooth outer edge easily formed by hot cutting or shearing as shown in FIG. 6.

We claim:

1. A method of making a shaped part, the method comprising the steps of:

heating a flat steel plate;

forming in the hot flat steel plate a thickness-reducing groove having an inner flank extending substantially perpendicular to an adjacent face of the groove;

hot-shaping the flat steel plate into a three-dimensional shape during formation of the groove;

hardening the hot-shaped grooved plate during formation of the groove and hot-shaping of the plate;

thereafter cooling the grooved, hot-shaped, and hardened plate; and thereafter shearing a piece off the cooled plate along a cut line in the groove immediately at the inner flank thereof.

2. The hot-shaping method defined in claim 1 wherein the groove is formed adjacent an edge of the plate, the plate being of full thickness to both sides of the groove.

3. The hot-shaping method defined in claim 2 wherein the groove is close to the edge.

4. The hot-shaping method defined in claim 3 wherein the groove is spaced from the edge by a distance generally equal to a material thickness of the plate immediately adjacent the groove after formation of the groove.

5. The hot-shaping method defined in claim 2 wherein the hot-shaping and hardening is done by deforming the plate between a pair of heated tools and heating the workpiece to above the $AC_3$ temperature.

6. The hot-shaping method defined in claim 1 wherein the plate after hot-shaping has at least one region of substantially greater thickness than at least one other region and the groove is formed in this one greater-thickness region and not in the other lesser-thickness region.

7. A method of making a shaped part, the method comprising the steps of sequentially:
   forming a flat steel plate with a region of greater thickness and with an adjacent region of lesser thickness;
   forming in the region of greater thickness but not in the region of lesser thickness a thickness-reducing groove;
   hot-shaping and hardening the flat steel plate into a three-dimensional shape;
   cooling the plate formed with the groove; and
   shearing a piece off the cooled plate along a cut line in the groove and in the region of lesser thickness adjacent the groove.

8. The method defined in claim 1 wherein the flat steel plate is formed with the groove, hot-shaped, and hardened by being engaged between a pair of tool.

9. The method defined in claim 8, further comprising the step of
   cooling the tools.

* * * * *